3,637,713
DIBENZAZEPINE DERIVATIVES
Michio Nakanishi, Nakatsu, Oita, and Chiaki Tashiro, Fukuoka, Japan, assignors to Yoshitomi Pharmaceutical Industries, Ltd., Higashiku, Osaka, Japan
No Drawing. Filed July 3, 1968, Ser. No. 742,135
Claims priority, application Japan, July 3, 1967, 42/42,657; Feb. 7, 1968, 43/7,571
Int. Cl. C07d 41/08, 99/10
U.S. Cl. 260—293.59         24 Claims

ABSTRACT OF THE DISCLOSURE

Compounds of the formula

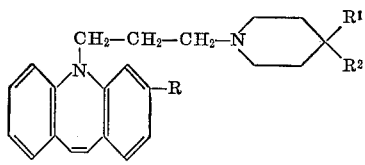

wherein R is H or Cl, $R^1$ is OH, cyano, carbamoyl, methoxy or acetyl, $R^2$ is phenyl, tolyl, (trifluoromethyl)phenyl, benzyl, dimethylamino or piperidino, or $R^1$ and $R^2$ combinedly can represent —S—$CH_2$—CO—N($R^3$)— in which $R^3$ is H, phenyl, tolyl or (trifluoromethyl)phenyl, and pharmaceutically acceptable acid addition salts thereof are useful e.g. as vasodilators.

This invention relates to new dibenzazepine derivatives. More particularly, the invention relates to dibenzazepine derivatives of the formula

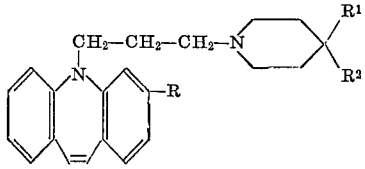

(I)

wherein
R is H or Cl,
$R^1$ is OH, cyano, carbamoyl, methoxy or acetyl, and
$R^2$ is phenyl, tolyl, (trifluoromethyl)phenyl, benzyl, dimethylamino or piperidino,
$R^1$ and $R^2$ combinedly represent

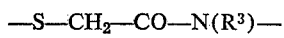
—S—$CH_2$—CO—N($R^3$)— in which $R^3$ is H, phenyl, tolyl or (trifluoromethyl) phenyl, and pharmaceutically acceptable acid addition salts thereof.

The object of the present invention is to provide novel dibenzazepine derivatives of the abovecited Formula I or pharmaceutically acceptable acid addition salts thereof, which are useful, for example, as vasodilators.

Another object of the present invention is to provide a method of the production of the aforesaid novel and useful dibenzazepine derivatives.

A further object of the present invention is to provide a vasodilating composition comprising a novel dibenzazepine derivative (I) or a pharmaceutically acceptable salt thereof.

The above-mentioned objects are realized (i) by reacting a compound of the formula:

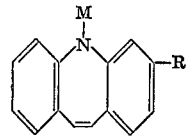

wherein M is H or alkali metal (optimally Na) with a compound of the formula:

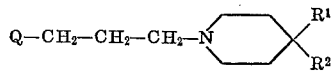

wherein Q is a reactive radical (optimally a halogen, e.g. Cl, Br or I, or reactive acid residue, e.g. —$SO_2OH$, acetoxycarbonyloxy, methylsulfonyloxy, p-tolylsulfonyloxy), or (ii) by reacting a compound of the formula

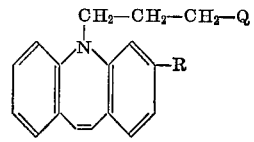

(Q being the same as above mentioned) with a compound of the formula

These reactions are carried out in a solvent, and are facilitated at an elevated temperature of about 50° to about 150° C., especially at about the boiling point of the solvent. Most suitable solvents for reaction (i) are aromatic hydrocarbons such as toluene and xylene, and for reaction (ii) alcohols such as ethanol. Any other suitable solvents such as methanol, propanol, isopropanol, butanol, acetone, methyl ethyl ketone, benzene, chlorobenzene, tetrahydrofuran, dioxane, dimethylformamide, dimethyl sulfoxide and liquid ammonia may also be used depending on the kinds of starting materials and reaction conditions. Acid acceptors such as alkali amides, alkali hydroxides, alkali carbonates and amines (e.g. triethylamine, pyridine) may be used. An excess of the starting piperidine may serve as acid acceptor.

Thus-produced dibenzazepine derivatives represented by the Formula I can form pharmaceutically acceptable acid addition salts with various inorganic and organic acids such as hydrochloric, hydrobromic, nitric, phosphoric, sulfuric, sulfamic, oxalic, maleic, fumaric, succinic, citric, tartaric, salicylic, methanesulfonic, o-(p-hydroxybenzoyl) benzoic acid and so on.

Dibenzazepine derivatives represented by the Formula I as well as their pharmaceutically acceptable acid addition salts, in animal tests, increase coronary and femoral blood flow, and suppress spontaneous motility and fighting activity, as shown, for example, by the following tests:

The coronary and femoral blood flow were measured by Ohashi-Yago's method (N. Yago: Folia Pharmacologica Japonica, vol. 57, p. 380 (1961) using the secobarbital anesthetized dog (male adult), the test compound being administered intravenously.

CORONARY BLOOD FLOW

| Test Compound*: | Dose (mg./kg.) | Percent increase | Duration (seconds) |
|---|---|---|---|
| A | 0.05 | 16 | 250 |
|   | 0.50 | 54 | 500 |
|   | 0.25 | 125 | 960 |
| B | 0.05 | 26 | 255 |
|   | 0.10 | 34 | 305 |
|   | 0.25 | 89 | 500 |
| C | 0.25 | 35 | 500 |
|   | 0.50 | 36 | 230 |
|   | 1.00 | 58 | 440 |
| D | 0.25 | 60 | 380 |
| E | 0.25 | 68 | 290 |
| F | 0.65 | 54 | 220 |

FEMORAL BLOOD FLOW

| E | 0.25 | 45 | 120 |
|---|---|---|---|
| F | 0.25 | 31 | 110 |
|   | 0.25 | 36 | 120 |
| G | 0.50 | 67 | 140 |
|   | 1.00 | 70 | 120 |

The acute toxicity of the object compounds of the present invention is as follows:

Intraperitoneal $LD_{50}$ in mice

Test compound [1]: Mg./kg.
A ------ 120
B ------ 120
C ------ 60
D ------ 60
E ------ 240
F ------ 320
G ------ 120

[1] Remarks
A = 5-[3-(4-hydroxy-4-m-trifluoromethylphenyl-piperidino)-propyl]-5H-dibenz[b,f]azepine hydrochloride
B = 5-[3-(4-hydroxy-4-p-tolyl-piperidino)propyl]-5H-dibenz hydrochloride
C = 5-[3-(4-carbamoyl-4-piperidino-piperidino)propyl]-5H-dibenz [b,f]azepine hydrochloride
D = 5-[3-(4-hydroxy-4-phenyl-piperidino)propyl-5H-dibenz [b,f]azeepine hydrochloride
E = 5-[3-(4-methoxy-4-phenyl-piperidino)propyl]-5H-dibenz [b,f]azepine hydrochloride
F = 5-[3-(4-acetyl-4-phenyl-piperidino)propyl]-5H-dibenz [b,f]azepine hydrochloride
G = 5-[3-(4-carbamoyl-4-dimethylamino-piperidino)-propyl] 5H-dibenz[b,f]azepine dihydrochloride Owing to the remarkable pharmaceutical activities, the compounds of the present invention are useful, for example, as vasodilators as per se or in the form of pharmaceutical composition in admixture with a suitable and conventional carrier or adjuvant, administrable orally or by way of injection, without giving harm to the host.

The pharmaceutical composition may take the form of tablets, granules, powders, syrups or injectable solutions and may be administered intravenously or orally, usual daily doses of active ingredient I, or salt thereof, lying in the range of 25 to 100 milligrams per human adult.

These compositions are especially useful as coronary or peripheral vasodilating agents and, more especially for the treatment of angina pectoris, coronary insufficiency, myocardial infarction and peripheral vascular disturbances.

Following are illustrative examples of presently preferred embodiments.

EXAMPLE 1

A mixture of 6.0 grams of 5-(3-chloropropyl)-5H-dibenz[b,f]azepine, 6.0 grams of 4-hydroxy-4-m-trifluoromethylphenyl-piperidine, 6.0 grams of potassium carbonate and 80 milliliters of ethanol is heated under reflux for 50 hours. The potassium carbonate is filtered off, and the filtrate is concentrated. The oily residue is dissolved in 50 milliliters of benzene. An oil layer formed on adding alcoholic hydrochloric acid is separated, washed with water and crystallized by adding 20 milliliters of iospropanol and then scratching the flask. Recrystallization from 95% ethanol yields 7.9 grams of yellow crystals of 5-[3-(4-hydroxy - 4 - m - trifluoromethylphenyl-piperidino)propyl]-5H-dibenz[b,f] azepine hydrochloride with one molecule of ethanol of crystallization. The crystals melt at 141° to 143° C.

Elementary analysis.—Calculated for $C_{29}H_{30}N_2ClF_3O \cdot C_2H_5OH$ (percent): C, 66.36; H, 6.47; N, 4.99. Found (percent): C, 66.14; H, 6.29; N, 4.89.

EXAMPLE 2

A mixture of 3.6 grams of 5-(3-chloropropyl)-5H-dibenz[b,f]azepine, 3.0 grams of 4 - methoxy-4-phenyl-piperidine, 5.0 grams of potassium carbonate and 40 milliliters of ethanol is heated under reflux for 50 hours. The potassium carbonate is filtered off, and the filtrate is concentrated. The residue is dissolved in 30 milliliters of benzene, and alcoholic hydrochloric acid is added. The benzene layer is washed with three 20 milliliter portions of water, and then the benzene is distilled off. The residue is extracted under warming with two 30 milliliter portions of isopropyl ether. The precipitate formed on adding ethyl acetate to the extract is recrystallized from ethyl acetate containing a small amount of methanol, giving 50 grams of whitish crystals of 5-[3-(4-methoxy-4-phenyl-piperidino) - propyl] - 5H - dibenz[b,f]azepine hydrochloride with ⅓ molecule of water crystallization. The crystals melt at 188° to 189° C.

Elementary analysis.—Calculated for $C_{29}H_{32}N_2ClO \cdot ⅓H_2O$ (percent): C, 74.74; H, 7.07; N, 6.01. Found (percent): C, 74.74; H, 7.15; N, 5.98.

EXAMPLE 3

A mixture of 10 grams of 5H-dibenz[b,f]azepine, 2.2 grams of sodium amide, 13.6 grams of 1-(3-chloropropyl)-4-methoxy-4-phenylpiperidine and 100 milliliters of xylene is refluxed for 6 hours. The product separated by column chromatography (200 grams of alumina; a toluene-hexane mixture eluant) is dissolved in 20 milliliters of ethyl acetate. The precipitate formed on adding alcoholic hydrochloric acid is separated by filtration and recrystallized from ethyl acetate containing a small amount of water to give 12.9 grams of crystalline 5-[3-(4-methoxy-4-phenylpiperidino)propyl] - 5H - dibenz [b,f]azepine hydrochloride with ⅓ molecule of water of crystallization melting at 187° to 189° C.

EXAMPLE 4

A mixture of 3.4 grams of 5-(3-chloropropyl)-5H-dibenz[b,f]azepine, 3.0 grams of 4-carbamoyl-4-phenyl-piperidine hydrochloride, 6.0 grams of potassium carbonate and 40 milliliters of ethanol is heated under reflux for 50 hours. After filtering off the potassium carbonate and distilling off the alcohol, the residue is dissolved in 40 milliliters of benzene. Alcoholic hydrochloric acid and then 10 milliliters of water are added, and the whole is shaken well. The benzene layer is removed, and the oil layer is separated from the aqueous layer. The oil is washed with water, dissolved in isopropanol, filtered and concentrated. The residue, when ethyl acetate is added thereto and the flask is scratched, yields a powder. Recrystallization from dimethylformamide gives 3.9 grams of crystallines 5-(3-[4-carbamoyl-4-phenyl-piperidino)propyl] - 5H - dimenz[b,f]-azepin hydrochloride with ⅙ molecule of dimethylformamide of crystallization. It melts at 260° to 216° C.

Elementary analysis.—Calculated for $C_{29}H_{32}N_3ClO \cdot ⅙CHON(CH_3)_2$ (percent): C, 72.46; H, 6.88; N, 9.12. Found (percent): C, 72.34; N, 6.81; N, 9.02.

EXAMPLE 5

A mixture of 4.2 grams of 5-(3-chloropropyl) - 5H-dibenz-[b,f]azepine, 3.0 grams of 4 - hydroxy-4-benzyl-piperidine, 5.0 grams of potassium carbonate and 50 milliliters of ethanol is refluxed for 55 hours. The potassium carbonate is filtered off, and the alcohol is distilled off. The oily residue is chromatographed (a column of 100 grams of alumina; a toluene-hexane mixture eluant), and then dissolved in ethyl acetate. Alcoholic hydrochloric acid is added. The mixture is concentrated, ethyl acetate is added, the whole is warmed, the ethyl acetate is then distilled off, and isopropyl ether is added. Scratching the flask yields a precipitate, which is dried. Thus 5.1 grams of a powder of 5-[3-(4-hydroxy-4-benzyl-piperidino)propyl] - 5H - dibenz[b,f]azepine hydrochloride with ⅔ molecule of water of crystallization melting with foaming at about 100° C., is obtained.

*Elementary analysis.*—Calculated for $C_{19}H_{33}N_2ClO \cdot \frac{2}{3}H_2O$ (percent): C, 73.63; H, 7.31; N, 5.92. Found (percent): C, 73.57; H, 7.47; N, 5.91.

EXAMPLE 6

A mixture of 4.3 grams of 5-(3-chloropropyl) - 5H-dibenz[b,f]azepine, 3.0 grams of 4 - cyano - 4 - phenyl-piperidine, 5.0 grams of potassium carbonate and 40 milliliters of ethanol is refluxed for 56 hours. Then the alcohol is distilled off. The residue is taken up with isopropyl ether. The oil formed on adding alcoholic hydrochloric acid to the extract is washed with water, dried well, and crystallized by adding ethyl acetate. The precipitate is recrystallized from ethyl acetate containing a small amount of 90% ethanol to give 4.1 grams of yellow needles of 5-[3-(4-cyano-4-phenyl-piperidino)propyl] - 5H - dibenz[b,f]azepine hydrochloride with ½ molecule of water and ½ molecule of ethanol of crystallization. The crystals melt at 209° to 210° C.

*Elementary analysis.*—Calculated for $C_{29}H_{30}N_3Cl \cdot \frac{1}{2}H_2O \cdot \frac{1}{2}C_2H_5OH$ (percent): C, 73.82; H, 7.02; N, 8.61. Found (percent): C, 73.66; H, 6.84; N, 8.36.

EXAMPLE 7

A mixture of 3.4 grams of 5-(3-chloropropyl) - 5H-dibenz[b,f]azepine, 3.0 grams of 4 - acetyl - 4-phenyl-piperidine hydrochloride, 5.0 grams of potassium carbonate and 40 milliliters of ethanol is refluxed for 45 hours. The alcohol is distilled off. The residue is extracted with two 50 milliliter portions of isopropyl ether. Alcoholic hydrochloric acid is added to the extract layer, and the oil layer formed is separated and washed with water. The oil is crystallized by adding ethyl acetate. Recrystallization from ethyl acetate containing a small amount of isopropanol affords 4.5 grams of whitish yellow crystals of 5 - [3-(4-acetyl-4-phenyl-piperidino) propyl] - 5H - dibenz[b,f]azepine hydrochloride with ⅙ molecule of isopropanol of crystallization melting at 194° to 195° C.

*Elementary analysis.*—Calculated for $C_{30}H_{33}N_2ClO \cdot \frac{1}{6}(CH_3)_2CHOH$ (percent): C, 75.83; H, 7.16; N, 5.80. Found (percent): C, 74.87; H, 7.13; N, 5.86.

EXAMPLE 8

A mixture of 4.3 grams of 5-(3-chloropropyl)-5H-dibenz-[b,f]azepine, 3.0 grams of 4 - hydroxy-4-p-tolyl-piperidine, 4.0 grams of potassium carbonate and 40 milliliters of ethanol is refluxed for 48 hours. The alcohol is distilled off, and the residue is extracted with isopropyl ether. The precipitate formed on adding alcoholic hydrochloric acid is collected, washed with water and dissolved in 60 milliliters of isopropanol. The solution is concentrated to 40 milliliters. The precipitate is collected by filtration and recrystallized from isopropanol containing a small amount of water to give 6.3 grams of crystalline 5 - 3 - (4 - hydroxy - 4 p - tolyl-piperidino) propyl]-5H-dibenz[b,f]azepine hydrochloride with one molecule of isopropanol of crystallization. It melts at 158° C.

*Elementary analysis.*—Calculated for $C_{29}H_{33}N_2ClO \cdot (CH_3)_2CHOH$ (percent): C, 73.75; H, 73.85; H, 7.93; N, 5.38. Found (percent): C, 73.94; H, 7.92; N, 5.35.

EXAMPLE 9

A mixture of 5.5 grams of 5-(3-chloropropyl)-5H-dibenz[b,f]azepine, 5.0 grams of 4-carbamoyl-4-piperidino-piperidine, 5.0 grams of potassium carbonate and 50 milliliters of ethanol is refluxed for 40 hours. The alcohol is distilled off. The residue is washed with 100 milliliters of water, and dissolved in isopropanol. The precipitate formed on adding alcoholic hydrochloric acid is recrystallized from 80% isopropanol and the crystals are dried well. Thus 7.5 grams of crystalline 5-[3-(4-carbamoyl-4-piperidino-piperdino)-propyl]-5H-dibenz[b,f]azepine dihydrochloride with ½ molecule of water of crystallization, is obtained. It melts at 235° to 237° C.

*Elementary analysis.*—Calculated for $C_{28}H_{40}N_4Cl_2O \cdot \frac{1}{2}H_2O$ (percent): C, 63.87; H, 7.47; N, 10.64. Found (percent): C, 63.92; H, 7.52; N, 10.68.

EXAMPLE 10

A mixture of 4.0 grams of 5-(3-chloropropyl)-5H-dibenz[b,f]azepine, 4.0 grams of 4-carbamoyl-4-dimethyl-amino-piperidine, 5.0 grams of potassium carbonate and 50 milliliters of ethanol is refluxed for 48 hours. The alcohol is distilled off. The residue is washed with 100 milliliters of water, and dissolved in 50 milliliters of ethanol. Alcoholic hydrochloric acid is added. The precipitate is collected by filtration and recrystallized from 95% methanol. Thus 7.1 grams of crystalline 5-[3-(4-carbamoyl-4-dimethylamine - piperidino) - propyl]-5H-dibenz[b,f]azepine dihydrochloride with ½ molecule of water and ¼ molecule of methanol of crystallization, is obtained. It melts at 225° C.

*Elementary analysis.*—Calculated for $C_{25}H_{34}N_4Cl_2O \cdot \frac{1}{2}H_2O \cdot \frac{1}{4}CH_3OH$ (percent): C, 61.33; H, 7.37; N, 11.33. Found (percent) C, 61.58; H, 7.17; N, 11.24.

EXAMPLE 11

A mixture of 4.3 grams of 5-(3-chloropropyl)-5H-dibenz[b,f]azepine, 4.0 grams of 3-oxo-1-thia-4,8-diaz-aspiro [4.5]decane hydrobromide, 7.0 grams of potassium carbonate and 40 milliliters of ethanol is refluxed for 60 hours. The alcohol is distilled off, and the residue is extracted with benzene. Alcoholic hydrochloric acid is added to the benzene layer. The oil layer then separated is washed with water, and dried. On adding isopropanol a precipitate is formed, which is recrystallized from 80% isopropanol to give 3.9 grams of 5-[3-(3-oxo-1-thia-4,8-diazaspiro[4.5]decan - 8 - yl) - propyl]-5H-dibenz[b,f] azepine hydrochloride melting at 246° C.

EXAMPLE 12

Reaction of 5-(3-chloropropyl)-5H-dibenz[b,f]azepine and 4-hydroxy-4-phenylpiperidine in ethanol in the presence of potassium carbonate under reflux affords 5-[3-(4-hydroxy-4-phenylpiperidino)propyl] - 5H - dibenz[b,f] azepine hydrochloride with one molecule of ethanol of crystallization melting at 230° C.

EXAMPLE 13

Reaction of 5-(3-chloropropyl)-5H-dibenz[b,f]azepine and 3 - oxo - 4 - p - tolyl - 1 - thia-4,8-diazaspiro[4.5] decane affords 5 - [3-(3-oxo-4-p-tolyl-1-thia-4,8-diazaspiro [4.5]-decan - 8 - yl)propyl] - 5H - dibenz[b,f]azepine melting at 223° C.

EXAMPLE 14

Reaction of 5-(3-chloropropyl)-5H-dibenz[b,f]azepine and 3 - oxo - 4 - m - trifluoromethylphenyl-1-thia-4,8-diazaspiro-[4.5]decane affords 5-[3-(3-oxo-4-m-trifluoromethylphenyl - 1 - thia - 4,8 - diazaspiro[4.5]decan-8-yl)-5H-dibenz[b,f]-azepine which, when recrystallized from 95% methanol, crystallizes with ½ molecule of methanol. The crystals melt at 145° C.

EXAMPLE 15

A mixture of 6.0 grams of 3-chloro-5-(3-chloropropyl)-5H-dibenz[b,f]azepine, 8.0 grams of 4-carbamoyl-4-piperidino-piperidine, 4.0 grams of potassium carbonate and 40 milliliters of ethanol is refluxed for 48 hours. The alcohol is distilled off. Scratching of the flask following the addition of 100 milliliters of water yields a precipitate, which is washed with water and dissolved in 40 milliliters of ethyl acetate. When alcoholic hydrochloric acid is added, a semi-solid is formed. This is separated, dissolved in 50 milliliters of warm water, and treated with activated charcoal. Then the solution is made alkaline with 10% sodium hydroxide solution. The precipitate formed is extracted with 150 milliliters of ethyl acetate. The extract layer is dried over potassium carbonate, treated with activated charcoal, concentrated, and dissolved in 50 milliliters of isopropanol. A solution of 5 grams of maleic acid in 50 milliliters of isopropanol is added. The precipitate is recrystallized from isopropanol to give 6.9 grams of 3-chloro-5-[3-(4-carbamoyl-4-piperidino-piperidino)propyl]-5H-dibenz[b,f]azepine di(hydrogen maleate) melting at 182° to 185° C.

EXAMPLE 16

A mixture of 6.0 grams of 3-chloro-5-(3-chloropropyl)-5H-dibenz[b,f]azepine, 6.5 grams of 4-carbamoyl-4-carbamoyl-4-dimethylamino-piperidine and 60 milliliters of ethanol is refluxed for 48 hours. The alcohol is distilled off. Scratching of the flask following addition of 100 milliliters of water yields a precipitate, which is dissolved in 100 milliliters of ethyl acetate and treated with activated charcoal. A solution of 5 grams of maleic acid in 50 milliliters of ethanol is added, and the precipitate obtained is washed with 50 milliliters of ethyl acetate and recrystallizzed from isopropanol to give 5.9 grams of crystalline 3-chloro-5-[3-(4 - carbamoyl - 4 - dimethylamino - piperidino)propyl] - 5H - dibenz[b,f]azepine di(hydrogen maleate), which melts at 145° C.

EXAMPLE 17

A mixture of 4.0 grams of 3-chloro-5-(3-chloropropyl)-5H-dibenz[b,f]azepine, 2.6 grams of 4-acetyl - 4 - phenylpiperidine, 4.0 grams of potassium carbonate and 40 milliliters of ethanol is refluxed for 48 hours. The alcohol is distilled off and the residue is extracted with toluene. The toluene layer is acidified with alcoholic hydrochloric acid, washed with two 20 milliliter portions of water, and concentrated to 20 milliliters. The product amine fraction is collected by column chromatography using 100 grams of silica gel and toluene as eluant. The toluene eluate is concentrated. When ether is added and the flask is scratched, a precipitate is formed. Thus 2.5 grams of powdery 3-chloro-5-[3 - (4 - acetyl - 4 - phenylpiperidino) propyl-5H-dibenz[b,f]azepine hydrochloride, which melts at 75° C., is obtained.

EXAMPLE 18

By the procedure of Example 17, 4.0 grams of 3-chloro-5-(3-chloropropyl) - 5H - dibenz[b,f]azepine is reacted with 4.0 grams of 4-hydroxy-4-m-trifluoromethylphenyl-piperidine in 40 milliliters of ethanol in the presence of 4.0 grams of potassium carbonate and the reaction mixture is treated to give 2.9 grams of powdery 3-chloro-5-[3-(4-hydroxy-4 - m - trifluoromethyl - phenylpiperidino)propyl] - 5H - dibenz[b,f]azepine hydrochloride melting at 95–105° C.

EXAMPLE 19

By the procedure of Example 17, 4.0 grams of 3-chloro-5-(3-chloropropyl) - 5H - dibenz[b,f]azepine is reacted with 3.0 grams of 4-hydroxy-4-phenylpiperidine to give 2.6 grams of crystalline 3-chloro-5-[3-(4-hydroxy-4-phenylpiperidino)-propyl]-5H - dibenz[b,f]azepine hydrochloride with ½ molecule of water of crystallization. It melts at 120° to 140° C.

EXAMPLE 20

A mixture of 4.0 grams of 3-chloro-5-(3-chloropropyl)-5H-dibenz[b,f]azepine, 3 grams of 4-hydroxy-4-p-tolyl-piperidine and 40 milliliters of dimethylformamide is heated at 90° C. for 15 hours. The solvent is distilled off under reduced pressure. The residue is dissolved in 100 milliliters of isopropyl ether. Alcoholic hydrochloric acid is added. The bottom oily layer is washed with 100 milliliters of water, and dissolved in isopropanol. Then the alcohol is distilled off. When 20 milliliters of chloroform is added, crystalls are formed. Thus is obtained 2.8 grams of 3-chloro-5-[3-(4-hydroxy - 4 - p-tolylpiperidino) propyl]-5H-dibenz[b,f]azepine hydrochloride with ¾ molecule of chloroform of crystallizaztion. The crystals melt at 204° to 205° C.

EXAMPLE 21

Ten grams of 3 - chloro - 5H - dibenz[b,f]azepine is allowed to react with sodium amide prepared from 1 gram of sodium in liquid ammonia. The ammonia is distilled off, 100 milliliters of toluene is added, and the mixture is refluxed to remove ammonia completely. 11 grams of 3-(4-cyano-4-phenylpiperidino)propyl chloride is added dropwise over one hour, and the mixture is refluxed for one further hour, then cooled, and filtered. The filtrate is concentrated, purified by column chromatography (200 grams of alumina; a toluene-hexane mixture eluant), and converted to the hydrochloride. Recrystallization from a methanol-ether mixture gives 7.5 grams of 3-chloro-5-[3-(4-cyano-4 - phenyl - piperidino)propyl] - 5H - dibenz[b,f]azepine hydrochloride melting at 201° C.

What is claimed is:
1. A compound of the formula

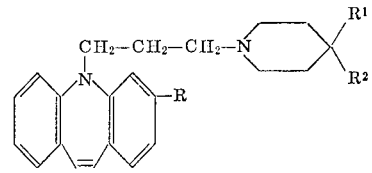

wherein
R is H or Cl,
R¹ is OH, cyano, carbamoyl, methoxy or acetyl, and
R² is phenyl, tolyl, (trifluoromethyl)phenyl, benzyl, dimethylamino or piperidino, or,
R¹ and R² combinedly represent

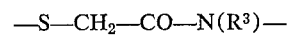

in which R³ is H, phenyl, tolyl or (trifluoromethyl)-phenyl,
2. A pharmaceutically acceptable acid addition salt of a compound as claimed in claim 1.
3. The compound as claimed in claim 2, wherein the pharmaceutically acceptable addition salt is hydrochloride.
4. A compound according to claim 1, namely, 5-[3-(4-hydroxy - 4 - m-trifluoromethylphenyl-piperidino)propyl]-5H-dibenz[b,f]azepine.
5. A compound according to claim 1, namely, 5-[3-(4-methoxy - 4 - phenyl - piperidino)propyl]-5H-dibenz[b,f]-azepine.
6. A compound according to claim 1, namely, 5-[3-(4-carbamoyl - 4 - phenyl - piperidino)propyl] - 5H - dibenz-[b,f]azepine.
7. A compound according to claim 1, namely, 5-[3-(4-hydroxy - 4 - benzyl - piperidino)propyl]-5H-dibenz[b,f]-azepine.
8. A compound according to claim 1, namely, 5-[3-(4-cyano - 4 - phenyl - piperidino)propyl] - 5H - dibenz[b,f]-azepine.
9. A compound according to claim 1, namely, 5-[3-(4-acetyl - 4 - phenyl-piperidino)propyl]-5H-dibenz[b,f]azepine.

10. A compound according to claim 1, namely, 5-[3-(4-hydroxy - 4 - p - tolyl-piperidino)propyl]-5H-dibenz[b,f]-azepine.

11. A compound according to claim 1, namely, 5-[3-(4-carbamoyl - 4 - piperidino-piperidino)propyl]-5H-dibenz[b,f]azepine.

12. A compound according to claim 1, namely, 5-[3-(4-carbamoyl - 4 - dimethylamino-piperidino)propyl]-5H-dibenz[b,f]azepine.

13. A compound according to claim 1, namely, 5-[3-(3-ro - 5 - [3 - (4 - acetyl - 4 - phenyl-piperidino)propyl]-5H-dibenz[b,f]azepine.

14. A compound according to claim 1, namely, 5-[3-(4-hydroxy - 4 - phenyl - piperidino)propyl]-5H-dibenz[b,f]-azepine.

15. A compound according to claim 1, namely, 5-[3-(3-oxo - 4 - p - tolyl-1-thia-4,8-diazaspiro[4.5]decan-8-yl)-propyl]-5H-dibenz[b,f]azepine.

16. A compound according to claim 1, namely, 5-[3-(3-oxo - 4 - m - trifluoromethylphenyl-1-thia-4,8-diazaspiro-[4.5]decan-8-yl)propyl]-5H-debenz[b,f]azepine.

17. A compound according to claim 24, namely, 3-chloro-5-[3-(4-carbamoyl - 4 - piperidino-piperidino)propyl]-5H-dibenz[b,f]azepine.

18. A compound according to claim 24, namely, 3-chloro - 5 - [3 - (4 - carbamoyl-4-dimethyl-amino-piperidino)-propyl]-5H-dibenz[b,f]azepine.

19. A compound according to claim 24, namely, 3-chloro - 5 - [3-(4-acetyl-4-phenyl-piperidino)propyl]-5H-dibenz[b,f]azepine.

20. A compound according to claim 24, namely, 3-chloro - 5 - [3 - (4-hydroxy-4-m-trifluoromethylphenyl-piperidino)propyl]-5H-dibenz[b,f]azepine.

21. A compound according to claim 24, namely, 3-chloro - 5 - [3 - (4 - hydroxy-4-phenyl-piperidino)propyl]-5H-debenz[b,f]azepine.

22. A compound according to claim 24, namely, 3-chloro - 5 - [3 - (4 - hydroxy-4-p-tolyl-piperidino)propyl]-5H-dibenz[b,f]azepine.

23. A compound according to claim 24, namely, 3-chloro - 5 - [3 - (4 - cyano - 4-phenyl-piperidino)propyl]-5H-dibenz[b,f]azepine.

24. A compound according to claim 1 wherein R is Cl.

References Cited

UNITED STATES PATENTS

| | | | |
|---|---|---|---|
| 3,056,774 | 10/1962 | Dietrich et al. | 260—239 |
| 3,068,222 | 12/1962 | Craig | 260—239 |
| 3,144,440 | 8/1964 | Schindler et al. | 260—239 |
| 3,156,692 | 11/1964 | Müslin et al. | 260—239 |
| 3,305,547 | 2/1967 | Stach et al. | 260—239 |
| 3,329,683 | 7/1967 | Nakanishi et al. | 260—293 |

ALTON D. ROLLINS, Primary Examiner

U.S. Cl. X.R.

424—267